United States Patent
Kim et al.

(10) Patent No.: US 9,500,521 B2
(45) Date of Patent: Nov. 22, 2016

(54) AMBIENT LIGHT SENSOR AND ELECTRONIC SYSTEM HAVING THE SAME

(71) Applicant: Samsung Electronics Co., Ltd., Suwon-Si, Gyeonggi-Do (KR)

(72) Inventors: Yun-Hong Kim, Suwon-si (KR); Moo-Young Kim, Suwon-si (KR); Tae-Chan Kim, Yongin-si (KR); Kwang-Hyun Lee, Hwaseong-si (KR); Seok-Yong Hong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 162 days.

(21) Appl. No.: 14/453,281

(22) Filed: Aug. 6, 2014

(65) Prior Publication Data

US 2015/0061501 A1 Mar. 5, 2015

(30) Foreign Application Priority Data

Sep. 5, 2013 (KR) .................. 10-2013-0106849

(51) Int. Cl.
*G01J 1/46* (2006.01)
*G01J 1/42* (2006.01)
*G06F 1/32* (2006.01)

(52) U.S. Cl.
CPC ............. *G01J 1/4204* (2013.01); *G01J 1/46* (2013.01); *G06F 1/3265* (2013.01); *Y02B 60/1242* (2013.01)

(58) Field of Classification Search
CPC ....... G01J 1/4204; G01J 1/46; G06F 1/3265; Y02B 60/1242
See application file for complete search history.

(56) References Cited

U.S. PATENT DOCUMENTS

| 6,642,500 | B2 | 11/2003 | Takahashi |
| 7,683,955 | B2 | 3/2010 | Shimizu |
| 8,059,141 | B2 | 11/2011 | Awakura et al. |
| 8,400,626 | B2 | 3/2013 | Mahowald |
| 9,074,939 | B2 * | 7/2015 | Mellot ............... G01J 1/44 |
| 2008/0217517 | A1 | 9/2008 | Hsieh |

FOREIGN PATENT DOCUMENTS

| JP | 2006237380 A | 9/2006 |
| JP | 4356886 B2 | 11/2009 |
| JP | 2010045294 A | 2/2010 |

* cited by examiner

*Primary Examiner* — Tony Ko
(74) *Attorney, Agent, or Firm* — Harness, Dickey & Pierce, P.L.C.

(57) ABSTRACT

An ambient light sensor includes a photoelectric conversion unit, a current control unit, a signal conversion unit and a comparison unit. The photoelectric conversion unit provides a photo current having a magnitude corresponding to illuminance of incident light to a first node. The current control unit generates a control current exponentially proportional to an elapse time based on a clock signal, provides the control current to the first node, and outputs a digital code corresponding to the elapse time in response to a reset signal. The signal conversion unit generates a comparison voltage logarithmically proportional to a sum of the photo current and the control current. The comparison unit generates the reset signal by comparing a magnitude of the comparison voltage and a magnitude of a reference voltage. The ambient light sensor generates the digital code effectively representing illuminance of ambient light that eyes of a human being perceives.

12 Claims, 13 Drawing Sheets

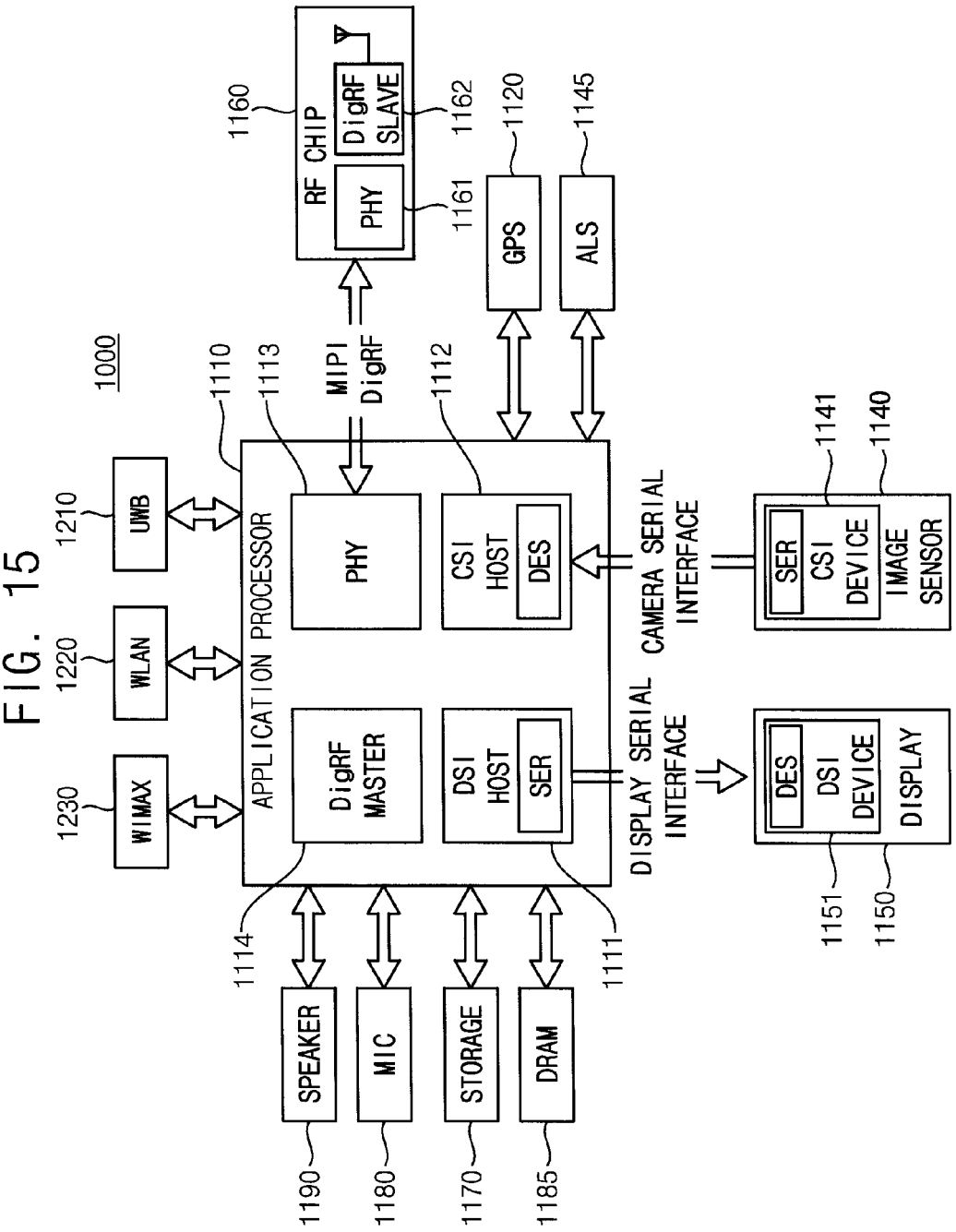

AMBIENT LIGHT SENSOR AND ELECTRONIC SYSTEM HAVING THE SAME

CROSS-REFERENCE TO RELATED APPLICATION(S)

This application claims priority under 35 USC §119 to Korean Patent Application No. 10-2013-0106849, filed on Sep. 5, 2013 in the Korean Intellectual Property Office (KIPO), the contents of which are herein incorporated by reference in their entirety.

BACKGROUND

1. Technical Field

Example embodiments relate to a light sensor, and more particularly to an ambient light sensor generating a digital code representing illuminance of ambient light.

2. Description of the Related Art

Recently, a mobile device may include an ambient light sensor to sense illuminance of ambient light. The mobile device may control the brightness of a display device associated with the mobile device by increasing the brightness of the display device when the illuminance of the ambient light is relatively high and decreasing the brightness of the display device when the illuminance of the ambient light is relatively low.

When controlling the brightness of the display device according to the illuminance of ambient light, it may be important to adjust the brightness in such a way that the adjustment is agreeable with the eyes of a user of the mobile device.

SUMMARY

Some example embodiments are directed to provide an ambient light sensor that detects illuminance of ambient light effectively.

Some example embodiments are directed to provide an electronic system including the ambient light sensor.

According to one or more example embodiments, an ambient light sensor includes a photoelectric conversion unit, a current control unit, a signal conversion unit and a comparison unit. The photoelectric conversion unit provides a photo current having a magnitude corresponding to illuminance of incident light to a first node. The current control unit generates a control current exponentially proportional to an elapse time based on a clock signal, provides the control current to the first node, and outputs a digital code corresponding to the elapse time in response to a reset signal. The signal conversion unit generates a comparison voltage logarithmically proportional to a sum of the photo current and the control current. The comparison unit generates the reset signal by comparing a magnitude of the comparison voltage and a magnitude of a reference voltage.

In example embodiments, the current control unit may generate the control current using a metal oxide semiconductor (MOS) transistor operating in a subthreshold region.

In example embodiments, the current control unit may generate the control current exponentially proportional to a number of cycles of the clock signal received after the reset signal is deactivated and provide the control current to the first node, and when the reset signal is activated, the current control unit may output the number of the cycles as the digital code and stop generating the control current.

In example embodiments, the current control unit may include a counting unit configured to perform a counting operation in response to the clock signal to generate a digital value, and configured to output the digital value as the digital code and to initialize the digital value in response to the reset signal, a digital-analog conversion unit configured to perform a digital-analog conversion on the digital value to generate a control voltage, and an NMOS transistor having a gate receiving the control voltage, a source coupled to a ground voltage and a drain coupled to the first node to provide the control current.

The control voltage may be lower than a threshold voltage of the NMOS transistor.

In example embodiments, the signal conversion unit may generate the comparison voltage using a MOS transistor operating in a subthreshold region.

In example embodiments, the signal conversion unit may include a voltage generation unit configured to maintain a voltage of the first node at a bias voltage, and configured to generate a first voltage logarithmically proportional to the sum of the photo current and the control current and to output the first voltage at a second node, a source follower unit configured to generate a second voltage corresponding to the first voltage multiplied by a first gain and to output the second voltage at a third node, and a differentiation unit configured to generate the comparison voltage by accumulating a time derivative of the second voltage.

The voltage generation unit may include a first NMOS transistor having a drain coupled to a supply voltage, a source coupled to the first node, and a gate coupled to the second node, a current source coupled between the supply voltage and the second node and generating a constant current, and a second NMOS transistor having a gate coupled to the first node, a drain coupled to the second node, and a source coupled to a ground voltage.

The bias voltage may be lower than a threshold voltage of the second NMOS transistor.

A difference between the first voltage and the bias voltage may be smaller than a threshold voltage of the first NMOS transistor.

The source follower unit may include a current source coupled between the supply voltage and the third node and generating a constant current, and a p-type metal oxide semiconductor (PMOS) transistor having a gate coupled to the second node, a drain coupled to a ground voltage, and a source coupled to the third node.

The differentiation unit may include a first capacitor coupled between the third node and a fourth node, an inverting amplifier coupled between the fourth node and a fifth node, a second capacitor coupled between the fourth node and the fifth node, and a reset switch coupled between the fourth node and the fifth node, the reset switch being switched in response to the reset signal. The differentiation unit may output the comparison voltage at the fifth node.

According to example embodiments, an electronic system includes an ambient light sensor, a display device and a processor. The ambient light sensor generates a digital code, which is logarithmically proportional to illuminance of incident light, based on a clock signal. The processor provides the clock signal to the ambient light sensor, and controls a brightness of the display device based on the digital code.

In example embodiments, the processor may control the brightness of the display device to be linearly proportional to the digital code.

In example embodiments, the ambient light sensor may include a photoelectric conversion unit, a current control unit, a signal conversion unit and a comparison unit. The photoelectric conversion unit may provide a photo current having a magnitude corresponding to the illuminance of the incident light to a first node. The current control unit may generate a control current exponentially proportional to an elapse time based on the clock signal, provide the control current to the first node, and output the digital code corresponding to the elapse time in response to a reset signal. The signal conversion unit may generate a comparison voltage logarithmically proportional to a sum of the photo current and the control current. The comparison unit may generate the reset signal by comparing a magnitude of the comparison voltage and a magnitude of a reference voltage.

At least one example embodiment relates to an ambient light sensor.

In at least one embodiment, the ambient light sensor includes a photodiode configured to generate a photo current based on an amount of incident light thereon; and a control unit configured to generate a digital code based on the incident light such that the digital code is logarithmically proportional to the amount of the incident light.

In at least one embodiment, the control unit is further configured to generate a control current that is exponentially proportional to an elapsed time since a pulse of a reset signal, and the ambient light sensor further comprises: a signal conversion unit configured to generate a comparison voltage that is logarithmically proportional to a sum of the photo current and the control current; and a reset circuit configured to pulse the reset signal if the comparison voltage is greater than or equal to a reference voltage.

In at least one embodiment, the control unit comprises: a metal oxide semiconductor (MOS) transistor having a gate configured to receive a control voltage; a digital-to-analog converter configured to convert a digital value to the control voltage such that the control voltage represents the elapsed time and is less than a threshold value of the MOS transistor; and a counting unit configured to, increment the digital value in response to a clock signal, and generate the digital code based on the digital value at a time of the pulse of the reset signal.

At least one example embodiment relates to an electronic system.

In at least one embodiment, the electronic system includes the ambient light sensor, a display device configured to display images having a brightness associated therewith; and a processor configured to adjust the brightness based on the digital code.

In at least one embodiment, the processor is configured to adjust the brightness based on the digital code such that, as the amount of incident light thereon decreases, small variations in the incident light result in larger adjustments to the brightness, and as the amount of incident light thereon increases, large variations in the incident light result in smaller adjustments to the brightness.

BRIEF DESCRIPTION OF THE DRAWINGS

Illustrative, non-limiting example embodiments will be more clearly understood from the following detailed description in conjunction with the accompanying drawings.

FIG. 15 is a block diagram illustrating an example of an interface used in the electronic system of FIG. 13.

DETAILED DESCRIPTION OF THE EMBODIMENTS

Figure 1:
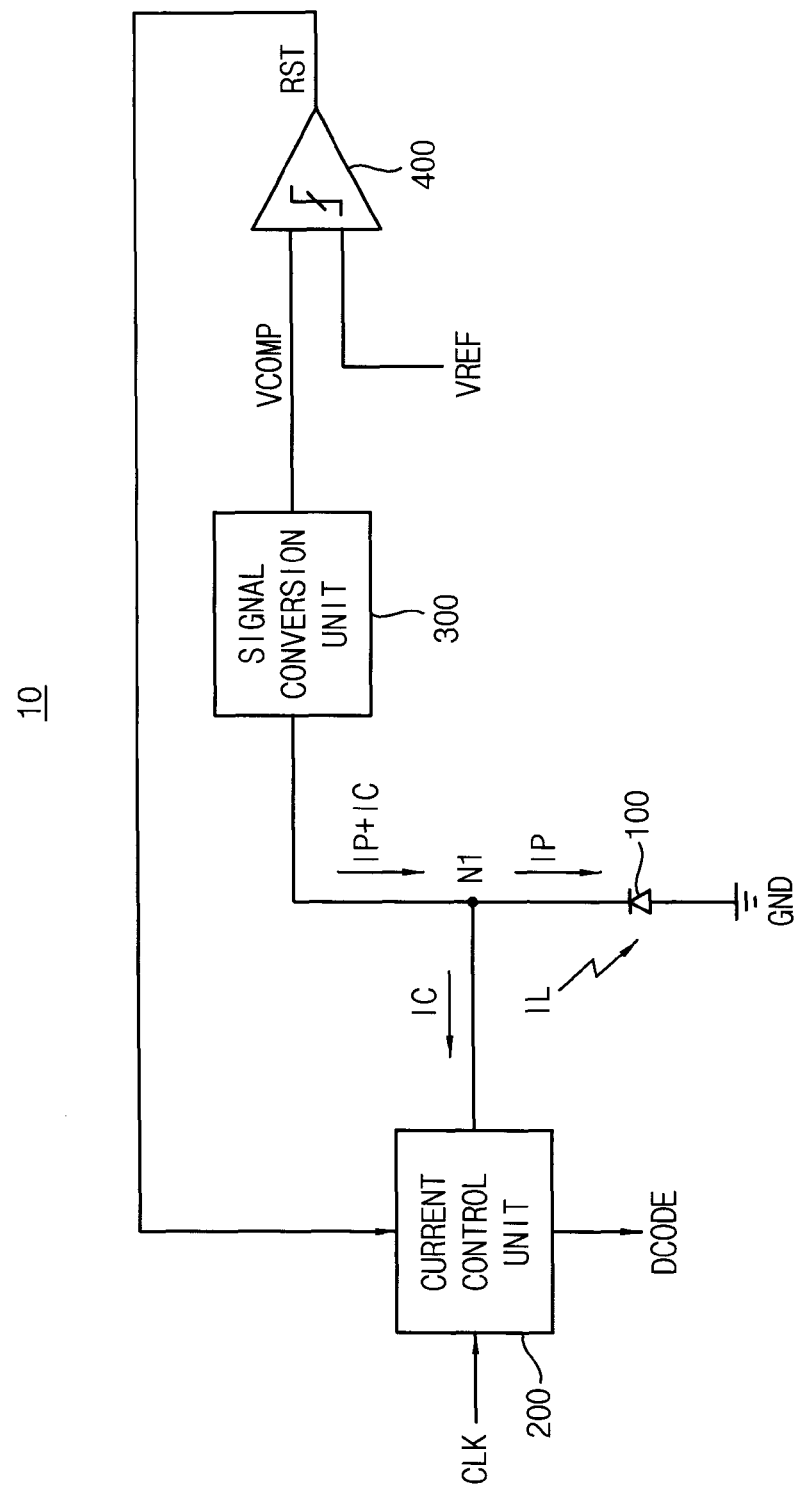
FIG. 1 is a block diagram illustrating an ambient light sensor according to example embodiments.

Various example embodiments will be described more fully with reference to the accompanying drawings, in which some example embodiments are shown. The inventive concepts may, however, be embodied in many different forms and should not be construed as limited to the embodiments set forth herein. Rather, these example embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an ambient light sensor according to example embodiments.

Referring to FIG. 1, an ambient light sensor 10 includes a photoelectric conversion unit 100, a current control unit 200, a signal conversion unit 300 and a comparison unit 400.

The photoelectric conversion unit 100 provides a photo current IP having a magnitude corresponding to illuminance of incident light IL to a first node N1. The magnitude of the photo current IP generated from the photoelectric conversion unit 100 may linearly proportional to the illuminance of the incident light IL.

As illustrated in FIG. 1, the photo current IP may flow from the first node N1 to a ground voltage GND through the photoelectric conversion unit 100.

In some example embodiments, the photoelectric conversion unit 100 may include a photodiode.

The current control unit 200 receives a clock signal CLK. The current control unit 200 measures an elapse time based on the clock signal CLK, generates a control current IC exponentially proportional to the elapse time, and provides the control current IC to the first node N1. In some example embodiments, the current control unit 200 may generate the clock signal CLK internally.

As illustrated in FIG. 1, the control current IC may flow from the first node N1 to the current control unit 200.

Therefore, as illustrated in FIG. 1, a current corresponding to a sum of the photo current IP and the control current IC may flow through the signal conversion unit 300.

The signal conversion unit 300 generates a comparison voltage VCOMP logarithmically proportional to a sum of the photo current IP and the control current IC.

The comparison unit 400 receives the comparison voltage VCOMP and a reference voltage VREF. The comparison unit 400 generates the reset signal RST by comparing a magnitude of the comparison voltage VCOMP and a magnitude of the reference voltage VREF. For example, the comparison unit 400 may deactivate the reset signal RST when the magnitude of the comparison voltage VCOMP is smaller than the magnitude of the reference voltage VREF, and activate the reset signal RST when the magnitude of the comparison voltage VCOMP is equal to or greater than the magnitude of the reference voltage VREF.

The current control unit 200 outputs a digital code DCODE corresponding to the elapse time in response to the reset signal RST provided from the comparison unit 400. For example, the current control unit 200 may output the digital code DCODE representing the elapse time when the reset signal RST is activated.

In some example embodiments, the current control unit 200 may count a number of cycles of the clock signal CLK received while the reset signal RST is deactivated, and generate the control current IC exponentially proportional to the number of cycles to provide the control current IC to the first node N1. The current control unit 200 may output the number of cycles as the digital code DCODE when the reset signal RST is activated. Therefore, the digital code DCODE outputted from the current control unit 200 when the reset signal RST is activated may represent the number of cycles of the clock signal CLK received while the reset signal RST is deactivated. The current control unit 200 may be turned off to stop generating the control current IC while the reset signal RST is activated.

As described above, the photo current IP generated from the photoelectric conversion unit 100 may be linearly proportional to the illuminance of the incident light IL, the control current IC generated from the current control unit 200 may be exponentially proportional to the number of cycles, and the comparison voltage VCOMP generated from the signal conversion unit 300 may be logarithmically proportional to a sum of the photo current IP and the control current IC. Therefore, as will be described later, the digital code DCODE outputted from the current control unit 200 when the reset signal RST is activated may be logarithmically proportional to the illuminance of the incident light IL.

In some example embodiments, the current control unit 200 may generate the control current IC using a metal oxide semiconductor (MOS) transistor operating in a subthreshold region while the reset signal RST is deactivated, and the signal conversion unit 300 may generate the comparison voltage VCOMP using a MOS transistor operating in a subthreshold region. The subthreshold region may represent an operation region of a MOS transistor when a voltage difference between a gate and a source is smaller than a threshold voltage of the MOS transistor.

Figure 2:
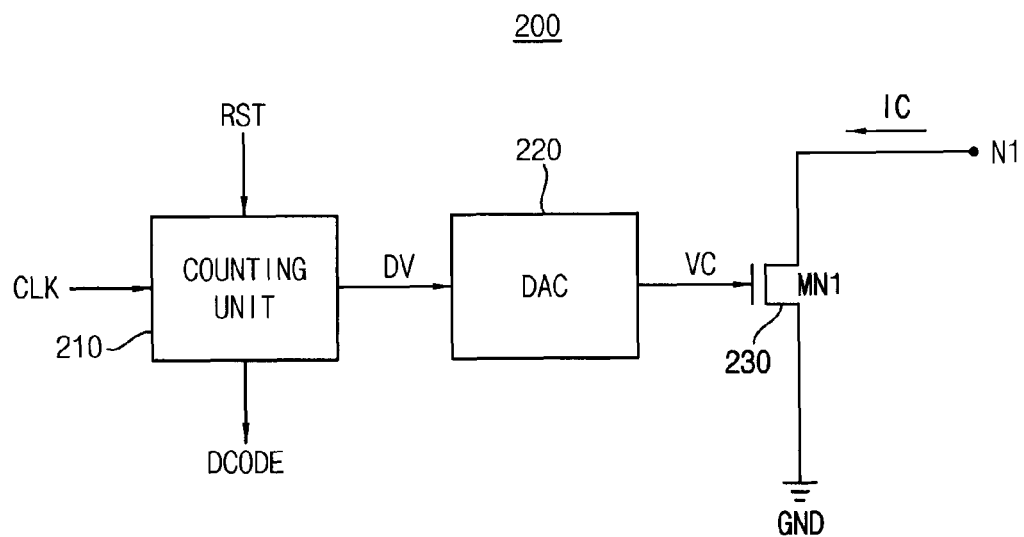
FIG. 2 is a block diagram illustrating an example of a current control unit included in an ambient light sensor of FIG. 1.

FIG. 2 is a block diagram illustrating an example of a current control unit included in an ambient light sensor of FIG. 1.

Referring to FIG. 2, the current control unit 200 may include a counting unit 210, a digital-analog conversion unit DAC 220 and a first NMOS transistor MN1 230.

The counting unit 210 may perform a counting operation in response to the clock signal CLK while the reset signal RST is deactivated to generate a digital value DV. The counting unit 210 may output the digital value DV as the digital code DCODE and initialize the digital value DV to zero when the reset signal RST is activated.

For example, the counting unit 210 may generate the digital value DV by performing an up-counting operation at every cycle of the clock signal CLK while the reset signal RST is deactivated. In this case, the digital value DV may correspond to a number of cycles of the clock signal CLK received after the reset signal RST is deactivated.

Figure 3:
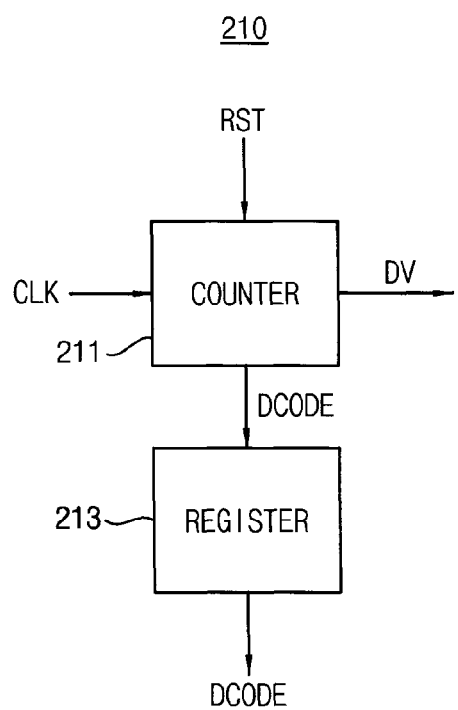
FIG. 3 is a block diagram illustrating an example of a counting unit included in a current control unit of FIG. 2.

FIG. 3 is a block diagram illustrating an example of a counting unit included in a current control unit of FIG. 2.

Referring to FIG. 3, the counting unit 210 may include a counter 211 and a register 213.

The counter 211 may generate the digital value DV by performing a counting operation in response to the clock signal CLK while the reset signal RST is deactivated. The counter 211 may output the digital value DV as the digital code DCODE and initialize the digital value DV to zero when the reset signal RST is activated.

The register 213 may store the digital code DCODE received from the counter 211 and output the digital code DCODE.

Therefore, although the digital value DV is initialized in response to the reset signal RST, the register 213 may store the digital value DV at a time when the reset signal RST is activated. As such, the counting unit 210 may provide the digital code DCODE after the reset signal RST is activated.

Referring again to FIG. 2, the digital-analog conversion unit 220 may perform a digital-analog conversion on the digital value DV to generate a control voltage VC. Therefore, the control voltage VC generated from the digital-analog conversion unit 220 may increase linearly such that the control voltage VC is linearly proportional to the number of cycles of the clock signal CLK.

The first NMOS transistor 230 may include a gate receiving the control voltage VC, a source coupled to the ground voltage GND and a drain coupled to the first node N1.

Figure 4:
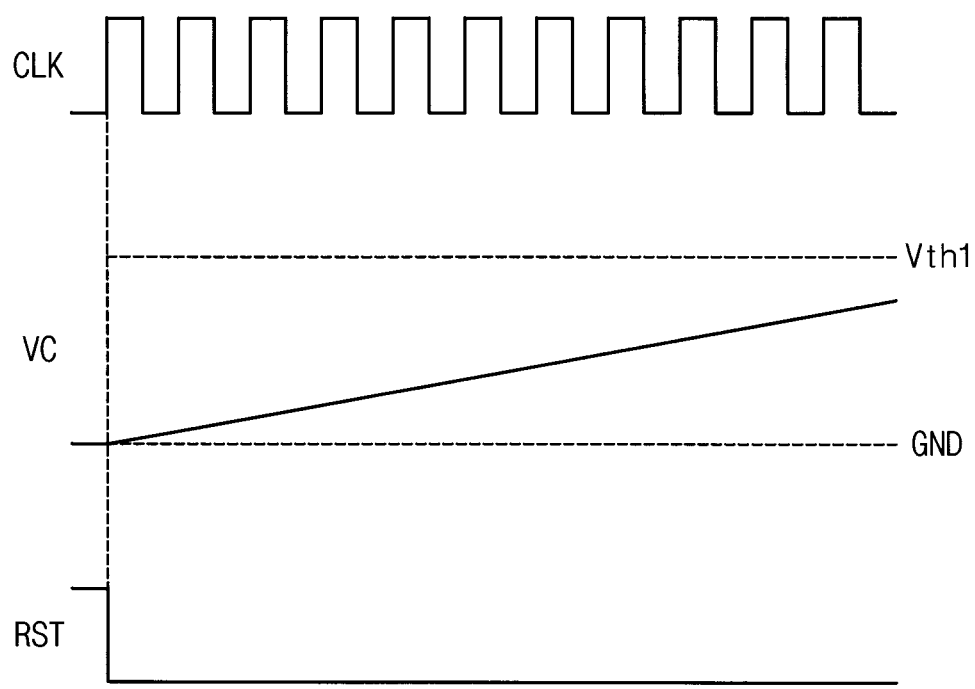
FIG. 4 is a graph for describing an operation of a digital-analog conversion unit included in a current control unit of FIG. 2.

FIG. 4 is a graph for describing an operation of a digital-analog conversion unit included in a current control unit of FIG. 2.

Referring to FIG. 4, when the counting unit 210 provides the digital value DV initialized to zero while the reset signal RST is activated, the digital-analog conversion unit 220 may output the ground voltage GND as the control voltage VC. Since the control voltage VC is applied to the gate of the first NMOS transistor 230, the first NMOS transistor 230 may be turned off to stop generating the control current IC while the reset signal RST is activated.

Since the digital-analog conversion unit 220 generates the control voltage VC by performing a digital-analog conversion on the digital value DV received from the counting unit 210 while the reset signal RST is deactivated, as illustrated in FIG. 4, the control voltage VC generated from the digital-analog conversion unit 220 while the reset signal RST is deactivated may increase linearly such that the control voltage VC is linearly proportional to the number of cycles of the clock signal CLK.

As illustrated in FIG. 4, the digital-analog conversion unit 220 may be controlled such that the control voltage VC generated from the digital-analog conversion unit 220 is lower than a threshold voltage Vth1 of the first NMOS transistor 230 while the reset signal RST is deactivated.

Since the source of the first NMOS transistor 230 is coupled to the ground voltage GND and the control voltage VC lower than the threshold voltage Vth1 of the first NMOS transistor 230 is applied to the gate of the first NMOS transistor 230, the first NMOS transistor 230 may operate in a subthreshold region to generate the control current IC while the reset signal RST is deactivated.

Therefore, the control current IC generated from the first NMOS transistor 230 in the subthreshold region while the reset signal RST is deactivated may be represented as [Equation 1].

$$IC = Is * e^{(VC/Vt)} \quad \text{[Equation 1]}$$

In [Equation 1], Is represents a saturation current and Vt represents a thermal voltage.

As represented in [Equation 1], the control current IC generated from the first NMOS transistor 230 may be exponentially proportional to the control voltage VC. As described above, since the control voltage VC generated from the digital-analog conversion unit 220 is linearly proportional to the number of cycles of the clock signal CLK, the control current IC may be exponentially proportional to the number of cycles of the clock signal CLK.

Figure 5:
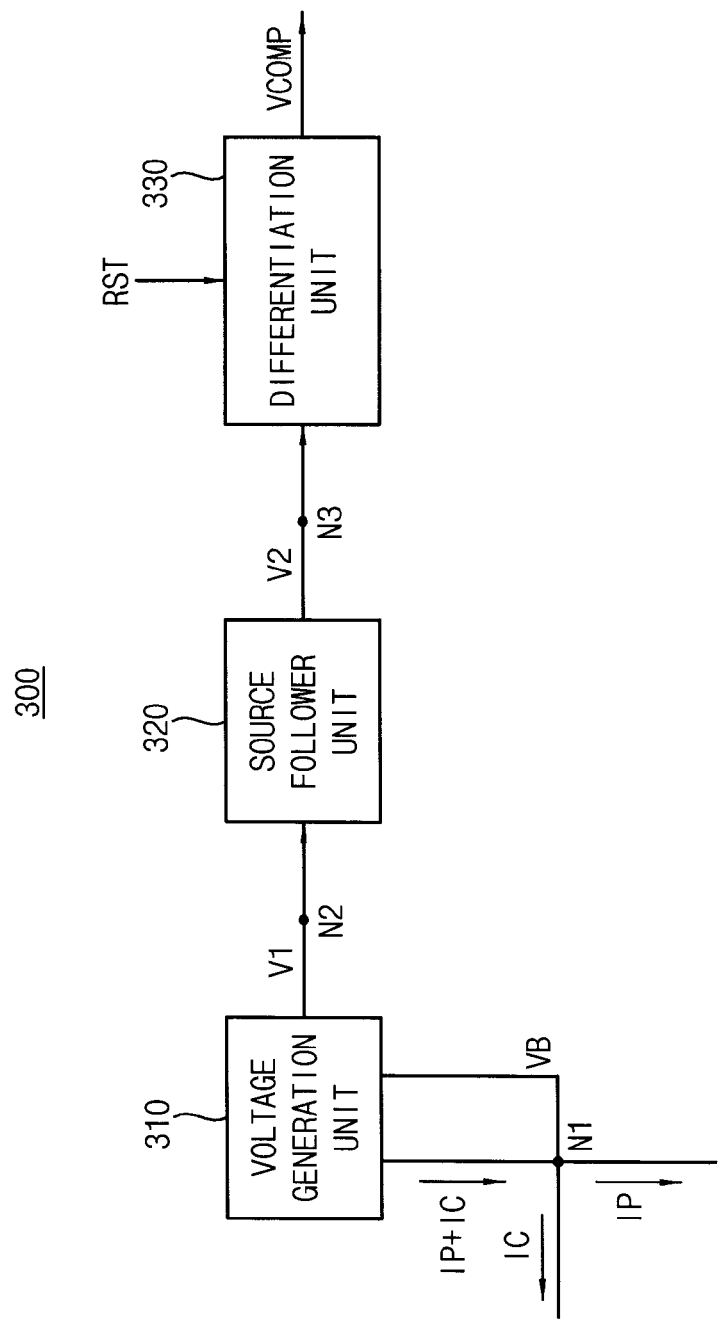
FIG. 5 is a block diagram illustrating an example of a signal conversion unit included in an ambient light sensor of FIG. 1.

FIG. 5 is a block diagram illustrating an example of a signal conversion unit included in an ambient light sensor of FIG. 1.

Referring to FIG. 5, the signal conversion unit 300 may include a voltage generation unit 310, a source follower unit 320 and a differentiation unit 330.

The voltage generation unit 310 may maintain a voltage of the first node N1 at a bias voltage VB. The voltage generation unit 310 may generate a first voltage V1 logarithmically proportional to the sum of the photo current IP and the control current IC, which flow through the first node N1, and output the first voltage V1 at a second node N2.

Figure 6:
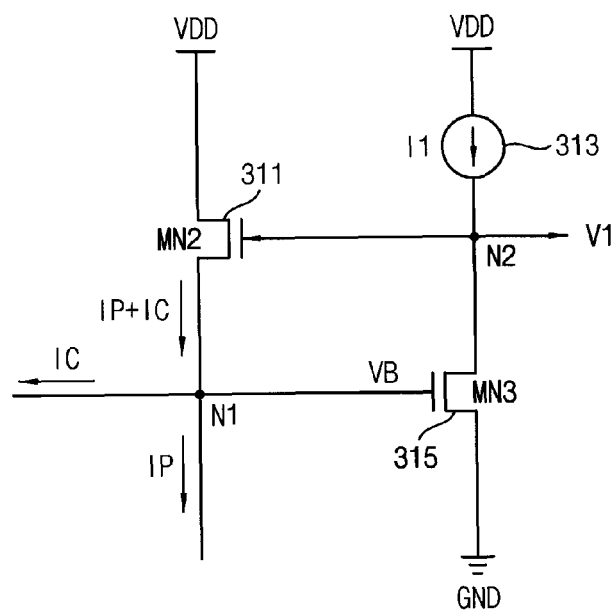
FIG. 6 is a circuit diagram illustrating an example of a voltage generation unit included in a signal conversion unit of FIG. 5.

FIG. 6 is a circuit diagram illustrating an example of a voltage generation unit included in a signal conversion unit of FIG. 5.

Referring to FIG. 6, the voltage generation unit 310 may include a second NMOS transistor MN2 311, a first current source 313 and a third NMOS transistor MN3 315.

The second NMOS transistor 311 may include a drain coupled to a supply voltage VDD, a source coupled to the first node N1, and a gate coupled to the second node N2.

The first current source 313 may be coupled between the supply voltage VDD and the second node N2, and generate a first current I1 having a constant magnitude.

The third NMOS transistor 315 may include a gate coupled to the first node N1, a drain coupled to the second node N2, and a source coupled to the ground voltage GND.

Since the first current I1 generated from the first current source 313 flows to the ground voltage GND through the third NMOS transistor 315, the bias voltage VB generated at the gate of the third NMOS transistor 315 may be determined based on a magnitude of the first current I1. That is, a magnitude of the bias voltage VB may be controlled by adjusting the magnitude of the first current I1. The magnitude of the first current I1 may be determined such that the bias voltage VB generated at the gate of the third NMOS transistor 315 is lower than a threshold voltage of the third NMOS transistor 315. Therefore, the third NMOS transistor 315 may operate in a subthreshold region.

As illustrated in FIG. 6, a current corresponding to a sum of the photo current IP, which is generated from the photoelectric conversion unit 100, and the control current IC, which is generated from the current control unit 200, may flow through the second NMOS transistor 311. Since the source of the second NMOS transistor 311 is maintained at the bias voltage VB, the first voltage V1 generated at the gate of the second NMOS transistor 311 may be determined based on the sum of the photo current IP and the control current IC. A threshold voltage of the second NMOS transistor 311 may be greater than a difference between the first voltage V1, which is generated at the gate of the second NMOS transistor 311, and the bias voltage VB, which is provided to the source of the second NMOS transistor 311. Therefore, the second NMOS transistor 311 may operate in a subthreshold region.

Referring again to FIG. 5, the source follower unit 320 may generate a second voltage V2 corresponding to the first voltage V1 multiplied by a first gain, and output the second voltage V2 at a third node N3.

Figure 7:
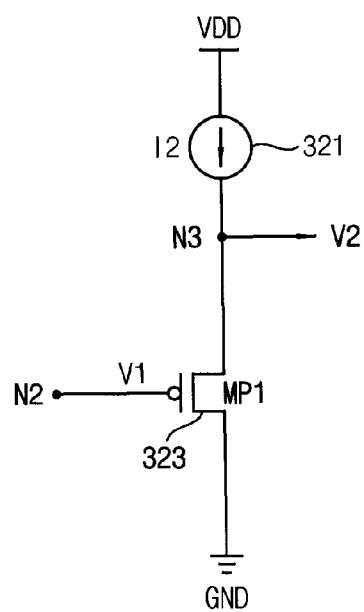
FIG. 7 is a circuit diagram illustrating an example of a source follower unit included in a signal conversion unit of FIG. 5.

FIG. 7 is a circuit diagram illustrating an example of a source follower unit included in a signal conversion unit of FIG. 5.

Referring to FIG. 7, the source follower unit 320 may include a second current source 321 and a first p-type metal oxide semiconductor (PMOS) transistor MP1 323.

The second current source 321 may be coupled between the supply voltage VDD and the third node N3, and generate a second current I2 having a constant magnitude.

The first PMOS transistor 323 may include a gate coupled to the second node N2 to receive the first voltage V1 from the voltage generation unit 310, a drain coupled to the ground voltage GND, and a source coupled to the third node N3 to output the second voltage V2.

As illustrated in FIG. 7, the first PMOS transistor 323 may operate as a source follower transistor such that the first PMOS transistor 323 receives the first voltage V1 through the gate and outputs the second voltage V2 through the source. Therefore, the second voltage V2 may correspond to the first voltage V1 multiplied by the first gain.

Referring again to FIG. 5, the differentiation unit 330 may receive the second voltage V2 from the source follower unit 320 and generate the comparison voltage VCOMP by accumulating a time derivative of the second voltage V2.

In some example embodiments, the differentiation unit 330 may initialize the comparison voltage VCOMP in response to the reset signal RST. For example, the differentiation unit 330 may generate the comparison voltage VCOMP by accumulating a time derivative of the second voltage V2 while the reset signal RST is deactivated, and initialize the comparison voltage VCOMP when the reset signal RST is activated.

Figure 8:
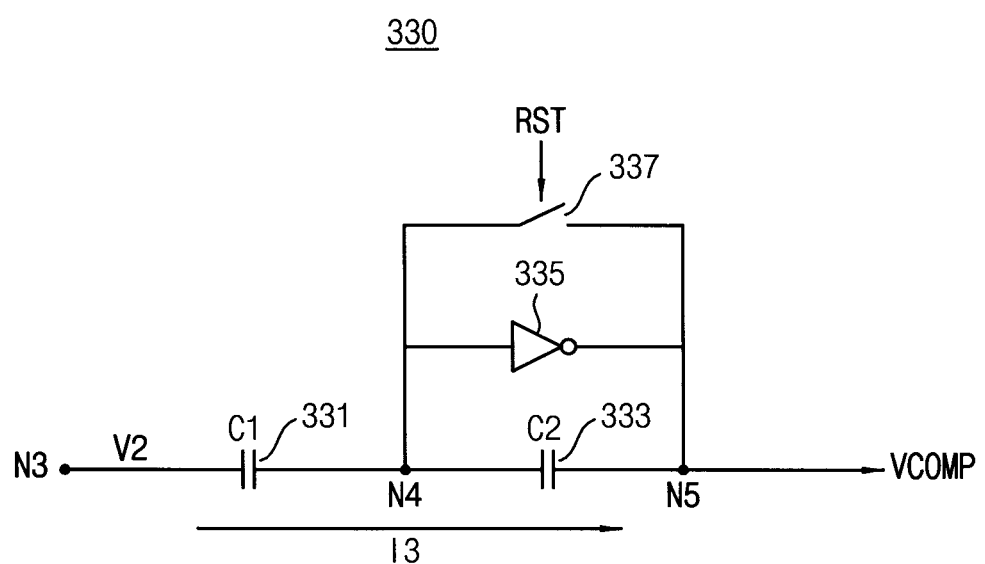
FIG. 8 is a block diagram illustrating an example of a differentiation unit included in a signal conversion unit of FIG. 5.

FIG. 8 is a block diagram illustrating an example of a differentiation unit included in a signal conversion unit of FIG. 5.

Referring to FIG. 8, the differentiation unit 330 may include a first capacitor 331, a second capacitor 333, an inverting amplifier 335 and a reset switch 337.

The first capacitor 331 may have a first electrode coupled to the third node N3 to receive the second voltage V2 from the source follower unit 320 and a second electrode coupled to a fourth node N4.

The second capacitor 333, the inverting amplifier 335 and the reset switch 337 may be coupled in parallel between the fourth node N4 and a fifth node N5.

The second capacitor 333 may be coupled between an output electrode of the inverting amplifier 335 and an input electrode of the inverting amplifier 335 such that the second capacitor 333 may provide a feedback path to the inverting amplifier 335.

The differentiation unit 330 may output the comparison voltage VCOMP through the fifth node N5.

The reset switch 337 may be switched in response to the reset signal RST.

When the reset signal RST is activated, the reset switch 337 may be turned on such that the second capacitor 333 may be discharged and the comparison voltage VCOMP may be initialized to a predetermined voltage.

When reset signal RST is deactivated, the reset switch 337 may be turned off. Since the second capacitor 333 provides the feedback path to the inverting amplifier 335, a voltage of the fourth node N4, to which the input electrode of the inverting amplifier 335 is connected, may be kept substantially in a constant voltage. That is, the fourth node N4 may be a virtual ground. Since the first electrode of the first capacitor 331 receives the second voltage V2 and the second electrode of the first capacitor 331 may be coupled to the fourth node N4, which is a virtual ground, a third current I3 having a magnitude proportional to the time derivative of the second voltage V2 may flow through the first capacitor 331 and the second capacitor 333. The third current I3 may be represented as [Equation 2].

$$I3 = C1 * \frac{d(V2)}{dt} \qquad \text{[Equation 2]}$$

In [Equation 2], C1 represents a capacitance of the first capacitor 331.

Since the first capacitor 331 and the second capacitor 333 are charged by the third current I3 and the comparison voltage VCOMP is proportional to an amount of charges charged in the second capacitor 333, the comparison voltage VCOMP may be represented as [Equation 3].

$$VCOMP = -\frac{C1}{C2} * \int \frac{d(V2)}{dt} \qquad \text{[Equation 3]}$$

In [Equation 3], C2 represents a capacitance of the second capacitor 333.

As represented in [Equation 3], the differentiation unit 330 may generate the comparison voltage VCOMP by accumulating the time derivative of the second voltage V2, and a magnitude of the comparison voltage VCOMP may be a magnitude of the second voltage V2 multiplied by a second gain, which corresponds to a ratio of the capacitance C1 of the first capacitor 331 to the capacitance C2 of the second capacitor 333.

As described above with reference to FIG. 7, the second voltage V2 generated from the source follower unit 320 may correspond to the first voltage V1 multiplied by the first gain, and as described above with reference to FIG. 8, the magnitude of the comparison voltage VCOMP may correspond to the magnitude of the second voltage V2 multiplied by the second gain. Therefore, the magnitude of the comparison voltage VCOMP may be linearly proportional to the magnitude of the first voltage V1.

Figure 9:
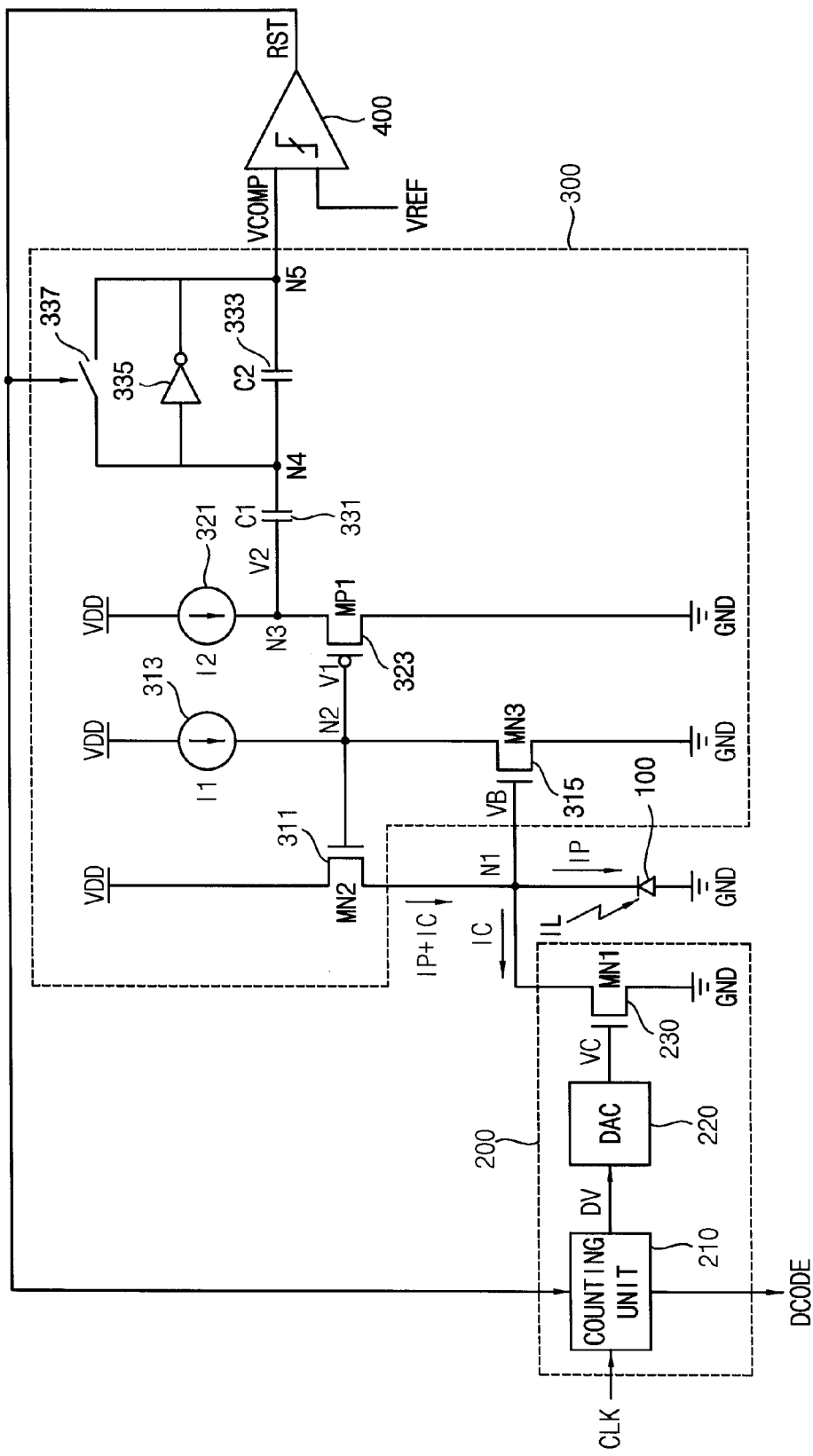
FIG. 9 is a circuit diagram illustrating an example of an ambient light sensor of FIG. 1.

FIG. 9 is a circuit diagram illustrating an example of an ambient light sensor of FIG. 1.

Referring to FIG. 9, an ambient light sensor 10a may include a photoelectric conversion unit 100, a current control unit 200, a signal conversion unit 300 and a comparison unit 400.

The current control unit 200 may be implemented with the current control unit 200 described above with reference to FIGS. 2 to 4, and the signal conversion unit 300 may be implemented with the signal conversion unit 300 described above with reference to FIGS. 5 to 8.

Figure 10:
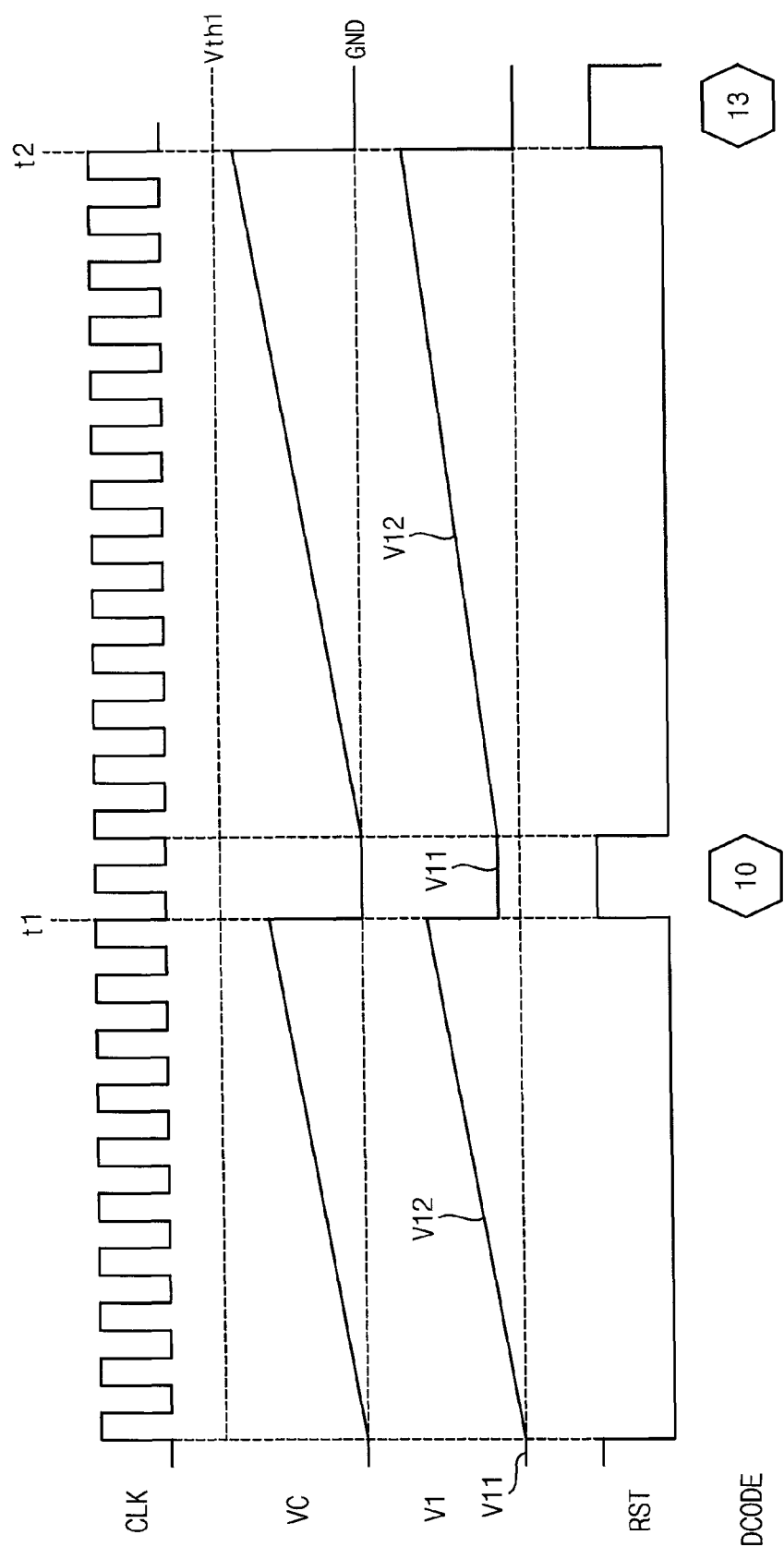
FIG. 10 is a graph for describing an operation of an ambient light sensor of FIG. 9.

FIG. 10 is a graph for describing an operation of an ambient light sensor of FIG. 9.

Hereinafter, an operation of the ambient light sensor 10a is described with reference to FIGS. 1 to 10.

As described above with reference to FIGS. 2 to 4, while the reset signal RST is activated, the counting unit 210 may output the digital value DV initialized to zero and the digital-analog conversion unit 220 may output the ground voltage GND as the control voltage VC in response to the initialized digital value DV. Therefore, the first NMOS transistor 230 may be turned off to stop generating the control current IC. As such, a current flowing through the second NMOS transistor 311 may correspond to the photo current IP.

Since the second NMOS transistor 311 operates in a subthreshold region and the source of the second NMOS transistor 311 is maintained at the bias voltage VB, a relation between the first voltage V1 generated at the gate of the second NMOS transistor 311 and the photo current IP may be represented as [Equation 4].

$$IP=Is*e\hat{\ }((V11-VB)Nt) \quad \text{[Equation 4]}$$

In [Equation 4], V11 represents the first voltage V1 generated at the gate of the second NMOS transistor 311 while the reset signal RST is activated.

Therefore, the first voltage V1 generated at the gate of the second NMOS transistor 311 while the reset signal RST is activated may be represented as [Equation 5].

$$V11=Vt*\ln(IP/Is)+VB \quad \text{[Equation 5]}$$

As described above with reference to FIGS. 2 to 4, while the reset signal RST is deactivated, the counting unit 210 may generate the digital value DV by performing a counting operation in response to the clock signal CLK, and the digital-analog conversion unit 220 may generate the control voltage VC linearly proportional to the digital value DV. Since the first NMOS transistor 230 generates the control current IC in response to the control voltage VC, a current flowing through the second NMOS transistor 311 may correspond to the sum of the photo current IP and the control current IC.

Since the second NMOS transistor 311 operates in a subthreshold region and the source of the second NMOS transistor 311 is maintained at the bias voltage VB, a relation among the first voltage V1 generated at the gate of the second NMOS transistor 311, the photo current IP and the control current IC may be represented as [Equation 6].

$$IP+IC=Is*e\hat{\ }((V12-VB)Nt) \quad \text{[Equation 6]}$$

In [Equation 6], V12 represents the first voltage V1 generated at the gate of the second NMOS transistor 311 while the reset signal RST is deactivated.

Therefore, the first voltage V1 generated at the gate of the second NMOS transistor 311 while the reset signal RST is deactivated may be represented as [Equation 7].

$$V12=Vt*\ln((IP+IC)/Is)+VB \quad \text{[Equation 7]}$$

Therefore, a variation of the first voltage V1 corresponding to a difference between the voltage V12, which corresponds to the first voltage V1 generated at the gate of the second NMOS transistor 311 and varies based a magnitude of the control current IC while the reset signal RST is deactivated, and the voltage V11, which corresponds to the first voltage V1 generated at the gate of the second NMOS transistor 311 and is maintained without varying while the reset signal RST is activated, may be represented as [Equation 8].

$$\begin{aligned} V12 - V11 &= (Vt*\ln((IP+IC)/Is)+VB) - \\ &\quad (Vt*\ln(IP/Is)+VB) \\ &= Vt*\ln((IP+IC)/IP) \\ &= Vt*\ln(1+IC/IP) \end{aligned} \quad \text{[Equation 8]}$$

As described above with reference to FIGS. 5 to 8, the magnitude of the comparison voltage VCOMP may be linearly proportional to the magnitude of the first voltage V1, and the comparison unit 400 may activate the reset signal RST when the magnitude of the comparison voltage VCOMP is equal to or greater than the magnitude of the reference voltage VREF. Therefore, when the variation of the first voltage V1 becomes greater than a threshold value, the comparison unit 400 may activate the reset signal RST. The threshold value may be determined based on a magnitude of the reference voltage VREF. That is, the comparison unit 400 may activate the reset signal RST if [Equation 9] is satisfied.

$$V12-V11=Vt*\ln(1+IC/IP)>=THV \quad \text{[Equation 9]}$$

In [Equation 9], THV represents the threshold value.

Since the control current IC is represented as [Equation 1], [Equation 9] may be rewritten using [Equation 1] as [Equation 10].

$$VC >= Vt*\ln(K*IP), \quad \text{[Equation 10]}$$
$$K = \frac{e^{THV/Vt}-1}{Is}$$

If [Equation 10] is satisfied, the comparison unit 400 may activate the reset signal RST. When the reset signal RST is activated, the counting unit 210 may output the digital value DV at a time when the reset signal RST is activated as the digital code DCODE.

For example, as illustrated in FIG. 10, while the reset signal RST is deactivated, the control voltage VC may linearly increase in response to the digital value DV that corresponds to the number of cycles of the clock signal CLK. Since the control voltage VC increases, the control current IC increases and the first voltage V1 also increases. At a first time t1, [Equation 10] may be satisfied, and the comparison unit 400 may activate the reset signal RST. At this time, the counting unit 210 may output the digital code DCODE having a value of 10, which corresponds to the number of cycles of the clock signal CLK received while the reset signal RST is deactivated.

When the reset signal RST is activated, the counting unit 210 may initialize the digital value DV to zero such that the control voltage VC may be the ground voltage GND. Therefore, the generation of the control current IC may be stopped and the first voltage V1 may decrease.

After that, when the reset signal RST is deactivated, the operation described above may be performed again. If the photo current IP increases in response to an increase of the illuminance of the incident light IL, the magnitude of the control voltage VC to satisfy [Equation 10] may also increase. Therefore, at a second time t2, [Equation 10] may be satisfied, and the counting unit 210 may output the digital code DCODE having a value of 13, which corresponds to the number of cycles of the clock signal CLK received while the reset signal RST is deactivated.

As represented in [Equation 10], the magnitude of the control voltage VC at a time when the reset signal RST is activated may be logarithmically proportional to the magnitude of the photo current IP.

As described above, since the magnitude of the control voltage VC is linearly proportional to the digital value DV and the magnitude of the photo current IP generated from the photoelectric conversion unit 100 is linearly proportional to the illuminance of the incident light IL, the digital code DCODE generated from the ambient light sensor 10a at a time when the reset signal RST is activated may be logarithmically proportional to the illuminance of the incident light IL.

Figure 11:
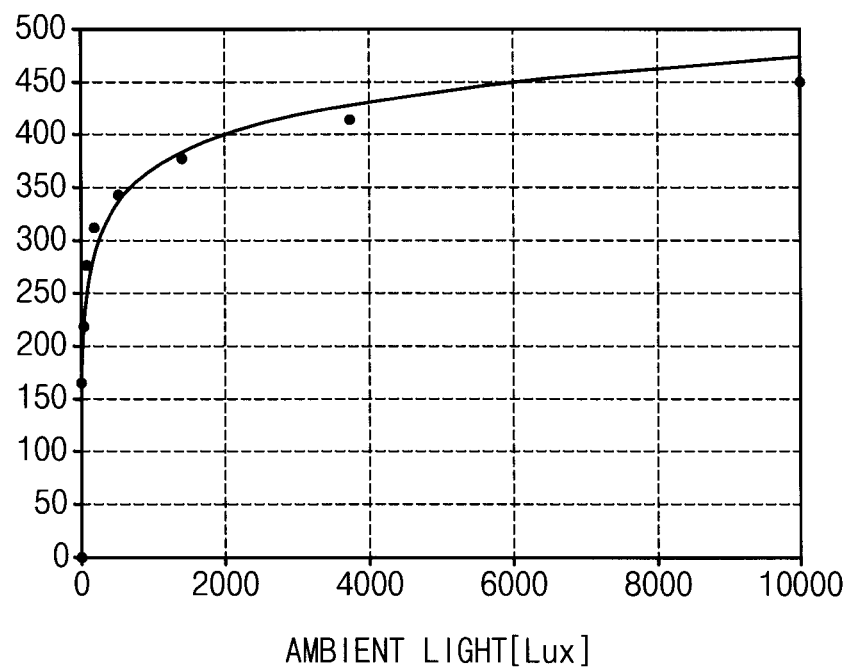
FIG. 11 is a graph for describing a relation between a digital code generated from an ambient light sensor of FIG. 1 and illuminance of incident light.

FIG. 11 is a graph for describing a relation between a digital code generated from an ambient light sensor of FIG. 1 and illuminance of incident light.

In FIG. 11, x-axis represents the illuminance of the incident light IL and y-axis represents the digital code DCODE.

As illustrated in FIG. 11, the digital code DCODE generated from the ambient light sensor 10 may be logarithmically proportional to the illuminance of the incident light IL.

Generally, the sensitivity of the human eye in perceiving ambient light is relatively high when the illuminance of the ambient light is relatively low, and is relatively low when the illuminance of the ambient light is relatively high.

Referring to FIG. 11, since the ambient light sensor 10 of FIG. 1 generates the digital code DCODE logarithmically proportional to the illuminance of the incident light IL, a variation of the digital code DCODE according to a variation of the illuminance of the incident light IL may be relatively large when the illuminance of the incident light IL is relatively low, and the variation of the digital code DCODE according to the variation of the illuminance of the incident light IL may be relatively small when the illuminance of the incident light IL is relatively high.

Therefore, because the digital code DCODE generated by the ambient light sensor 10 is logarithmically proportional to the illuminance of the incident light IL, the ambient light sensor 10 is able to produce a signal representing the incident light IL such that the human eye can perceive adjustments to a brightness based on the signal in both low and high levels of ambient light.

In addition, since the ambient light sensor 10 according to example embodiments generates the digital code DCODE logarithmically proportional to the illuminance of the incident light IL, a range of the illuminance of the incident light IL that the ambient light sensor 10 is able to measure may increase.

Figure 12:
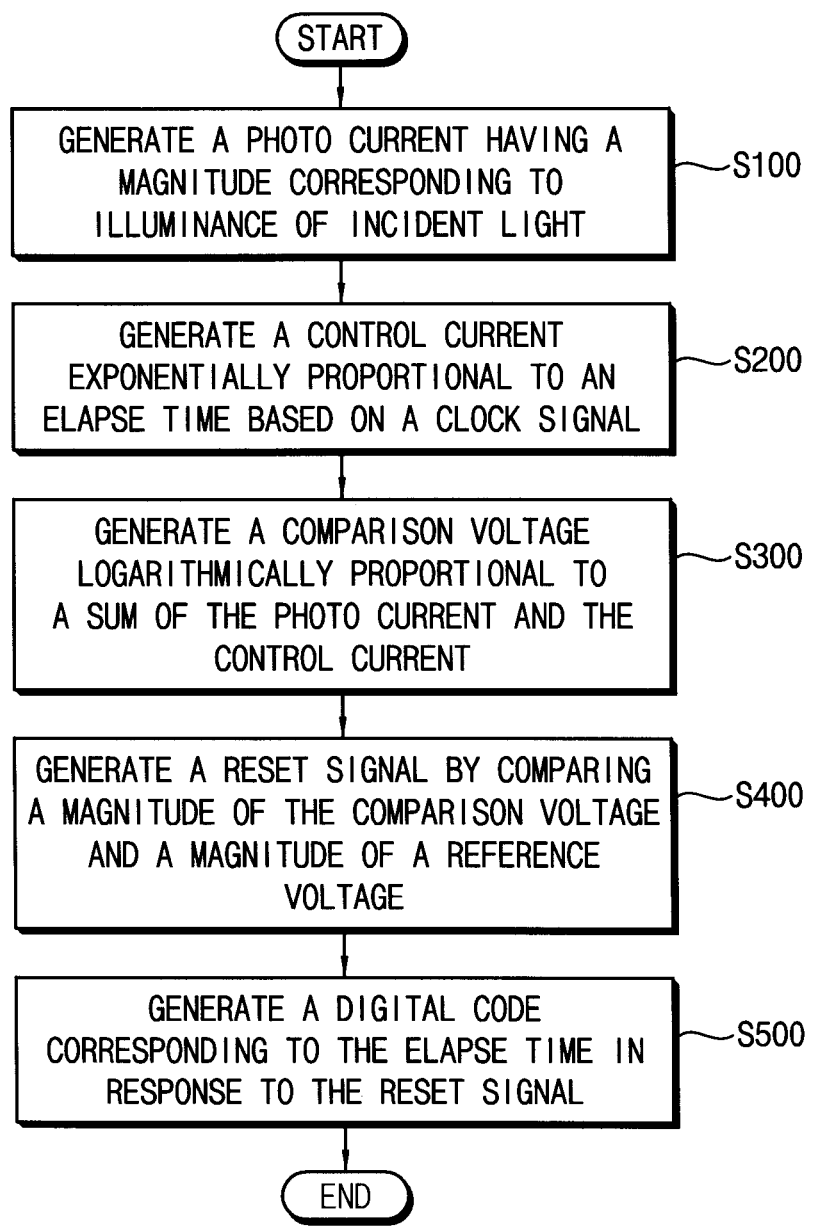
FIG. 12 is a flow chart illustrating a method of measuring illuminance of ambient light according to example embodiments.

FIG. 12 is a flow chart illustrating a method of measuring illuminance of ambient light according to example embodiments.

Referring to FIG. 12, in a method of measuring illuminance of ambient light according to example embodiments, a photo current having a magnitude corresponding to illuminance of incident light is generated by a photoelectric conversion unit (step S100), a control current exponentially proportional to an elapse time is generated based on a clock signal (step S200), a comparison voltage logarithmically proportional to a sum of the photo current and the control current is generated (step S300), a reset signal is generated by comparing a magnitude of the comparison voltage and a magnitude of a reference voltage (step S400), and a digital code corresponding to the elapse time is generated in response to the reset signal (step S500).

In some example embodiments, a control voltage that is exponentially proportional to a number of cycles of the clock signal received while the reset signal is deactivated may be generated. In this case, the number of cycles may be outputted as the digital code when the reset signal is activated.

The method of measuring illuminance of ambient light of FIG. 12 may be performed by the ambient light sensor 10 of FIG. 1. A structure and an operation of the ambient light sensor 10 of FIG. 1 are described above with reference to FIGS. 1 to 11. Therefore, a detail description of the ambient light sensor 10 will be omitted.

Figure 13:
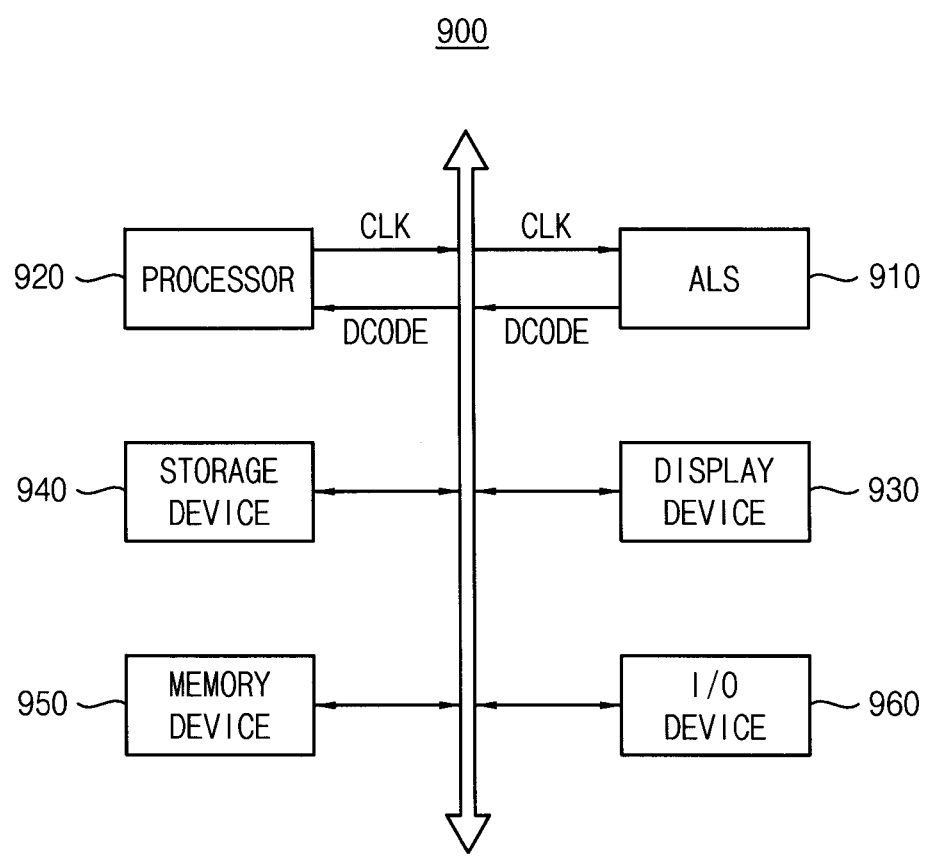
FIG. 13 is a block diagram illustrating an electronic system including an ambient light sensor according to an example embodiment.

FIG. 13 is a block diagram illustrating an electronic system including an ambient light sensor according to an example embodiment.

Referring to FIG. 13, an electronic system 900 includes an ambient light sensor ALS 910, a processor 920 and a display device 930.

The electronic system 900 may further include a storage device 940, a memory device 950 and an input/output device 960. Although not illustrated in FIG. 13, the electronic system 900 may further include ports that communicate with a video card, a sound card, a memory card, a universal serial bus (USB) device, or other electronic devices.

The processor 920 provides a clock signal CLK to the ambient light sensor 910. The ambient light sensor 910 generates a digital code DCODE, which is logarithmically proportional to illuminance of incident light, based on the clock signal CLK and provides the digital code DCODE to the processor 920. Therefore, a variation of the digital code DCODE according to a variation of the illuminance of the incident light may be relatively large when the illuminance of the incident light is relatively low, and the variation of the digital code DCODE according to the variation of the illuminance of the incident light may be relatively small when the illuminance of the incident light is relatively high. Generally, sensitivity of human eyes in perceiving ambient light is relatively high when the illuminance of the ambient light is relatively low, and is relatively low when the illuminance of the ambient light is relatively high. Therefore, the ambient light sensor 910 may generate the digital code DCODE effectively representing the illuminance of the incident light that the human eye perceives.

The processor 920 controls a brightness of the display device 930 based on the digital code DCODE received from the ambient light sensor 910.

In some example embodiments, the processor 920 may control the brightness of the display device 930 to be linearly proportional to the digital code DCODE.

Therefore, the electronic system 900 may effectively adjust the brightness of the display device 930 based on the illuminance of the ambient light such that eyes of a user feel comfortable in watching the display device 930.

The ambient light sensor 910 may be implemented with the ambient light sensor 10 of FIG. 1. A structure and an operation of the ambient light sensor 10 of FIG. 1 are described above with reference to FIGS. 1 to 11. Therefore, a detail description of the ambient light sensor 910 will be omitted.

The storage device 940 may store multimedia digital signal. The storage device 940 may include a non-volatile memory device such as a flash memory device, a solid state drive (SSD), a hard disk drive (HDD), a compact disk read-only memory (CD-ROM) drive, etc.

The display device 930 may display the multimedia data stored in the storage device 940. The display device 930 may include a liquid crystal display (LCD) device, an organic light emitting diode (OLED) display device, etc.

Figure 14:
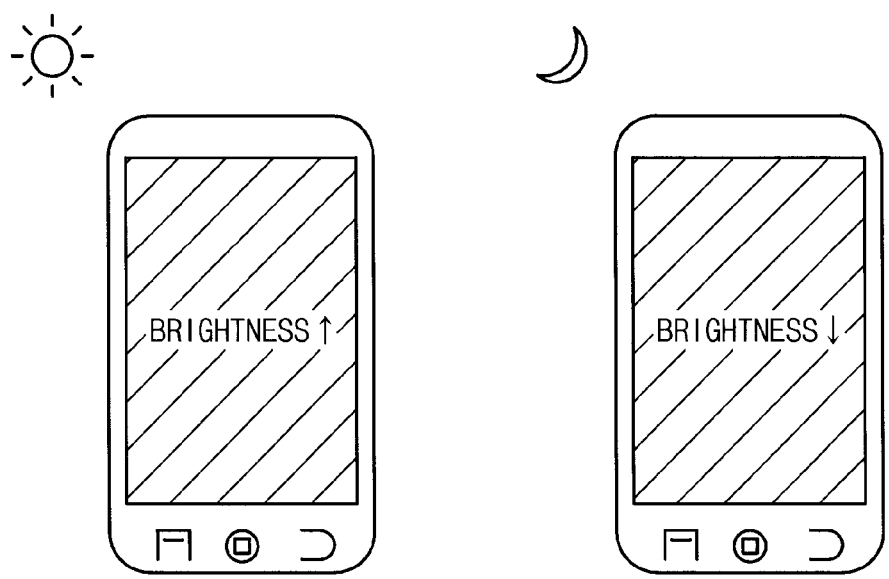
FIG. 14 is diagram for describing an operation of an electronic system of FIG. 13.

FIG. 14 is diagram for describing an operation of an electronic system of FIG. 13.

As described above, the ambient light sensor 910 may generates the digital code DCODE logarithmically proportional to the illuminance of the incident light, and the processor 920 may control the brightness of the display device 930 to be linearly proportional to the digital code DCODE. For example, as illustrated in FIG. 14, the processor 920 may increase the brightness of the display device 930 based on the digital code DCODE when the illuminance of the ambient light is relatively high, and decrease the brightness of the display device 930 based on the digital code DCODE when the illuminance of the ambient light is relatively low. As such, the electronic system 900 may increase visibility of the display device 930.

Referring again to FIG. 13, the processor 920 may perform various calculations or tasks. According to some embodiments, the processor 920 may be a microprocessor or a CPU. The processor 920 may communicate with the storage device 940, the memory device 950 and the input/output device 960 via an address bus, a control bus, and/or a data bus. In some example embodiments, the processor 920 may be coupled to an extended bus, such as a peripheral component interconnection (PCI) bus.

The memory device 950 may store data required for an operation of the electronic system 900. The memory device 950 may be a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The input/output device 960 may include a touch screen device, a keypad, a keyboard, a mouse, a printer, a speaker, etc.

The ambient light sensor 910 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to example embodiments, the ambient light sensor 910 may be integrated with the processor 920 in one chip, or the ambient light sensor 910 and the processor 920 may be implemented as separate chips.

The electronic system 900 may be any electronic system using an ambient light sensor. For example, the electronic system 900 may include a mobile phone, a smart phone, a portable multimedia player (PMP), a personal digital assistant (PDA), a digital camera, etc.

FIG. 15 is a block diagram illustrating an example of an interface used in the electronic system of FIG. 13.

Referring to FIG. 15, an electronic system 1000 may be implemented by a data processing device (e.g., a cellular phone, a personal digital assistant, a portable multimedia player, a smart phone, etc.) that uses or supports a mobile industry processor interface (MIPI) interface. The electronic system 1000 may include an application processor 1110, an image sensor 1140, a display device 1150, etc.

A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The electronic system 1000 may further include a radio frequency (RF) chip 1160 performing a communication with the application processor 1110. A physical layer (PHY) 1113 of the electronic system 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The electronic system 1000 may further include an ambient light sensor ALS 1145. The application processor 1110 may provide a clock signal to the ambient light sensor 1145, and the ambient light sensor 1145 may generate a digital code, which is logarithmically proportional to illuminance of incident light, based on the clock signal and provide the digital code to the application processor 1110. The application processor 1110 may control a brightness of the display device 1150 based on the digital code.

The electronic system 1000 may further include a global positioning system (GPS) 1120, a storage 1170, a MIC 1180, a DRAM device 1185, and a speaker 1190. In addition, the electronic system 1000 may perform communications using an ultra wideband (UWB) 1210, a wireless local area network (WLAN) 1220, a worldwide interoperability for microwave access (WIMAX) 1230, etc. However, the structure and the interface of the electronic system 1000 are not limited thereto.

The foregoing is illustrative of the inventive concepts and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An ambient light sensor, comprising:
   a photoelectric conversion unit configured to,
      generate a photo current having a magnitude corresponding to an illuminance of incident light, and
      provide the photo current to a first node;
   a current control unit configured to,
      generate a control current based on a clock signal, the control current being exponentially proportional to an elapse time,
      provide the control current to the first node, and
      output a digital code corresponding to the elapse time in response to a reset signal;
   a signal conversion unit configured to generate a comparison voltage such that the comparison voltage is logarithmically proportional to a sum of the photo current and the control current; and
   a comparison unit configured to generate the reset signal by comparing a magnitude of the comparison voltage and a magnitude of a reference voltage.

2. The ambient light sensor of claim 1, wherein the current control unit comprises:
   a metal oxide semiconductor (MOS) transistor, the MOS transistor configured to generate the control current when the MOS transistor is operating in a subthreshold region.

3. The ambient light sensor of claim 1, wherein the current control unit is configured to generate the control current such that the control current is exponentially proportional to a number of cycles of the clock signal received after the reset signal is deactivated, and when the reset signal is activated, the current control unit is configured to output the number of the cycles as the digital code and stop generating the control current.

4. The ambient light sensor of claim 1, wherein the current control unit comprises:
   a counting unit configured to,
      count pulses of the clock signal to generate a digital value,
      output the digital value as the digital code, and
      initialize the digital value in response to the reset signal;
   a digital-analog conversion unit configured to convert the digital value to a control voltage; and
   an NMOS transistor having a gate receiving the control voltage, a source coupled to a ground voltage and a drain coupled to the first node to provide the control current thereto.

5. The ambient light sensor of claim 4, wherein the control voltage applied to the gate of the NMOS transistor is lower than a threshold voltage of the NMOS transistor.

6. The ambient light sensor of claim 1, wherein the signal conversion unit is configured to generate the comparison voltage using a MOS transistor operating in a subthreshold region.

7. The ambient light sensor of claim 1, wherein the signal conversion unit comprises:
   a voltage generation unit configured to,
      maintain a voltage of the first node at a bias voltage,
      generate a first voltage logarithmically proportional to the sum of the photo current and the control current, and
      output the first voltage at a second node;
   a source follower unit configured to,
      generate a second voltage corresponding to the first voltage multiplied by a first gain, and
      output the second voltage to a third node; and
   a differentiation unit configured to generate the comparison voltage by accumulating a time derivative of the second voltage.

8. The ambient light sensor of claim 7, wherein the voltage generation unit comprises:
   a first NMOS transistor having a drain coupled to a supply voltage, a source coupled to the first node, and a gate coupled to the second node;
   a current source coupled between the supply voltage and the second node, the current source generating a constant current; and
   a second NMOS transistor having a gate coupled to the first node, a drain coupled to the second node, and a source coupled to a ground voltage.

9. The ambient light sensor of claim 8, wherein the bias voltage applied to the first node connected to the gate of the second NMOS transistor is lower than a threshold voltage of the second NMOS transistor.

10. The ambient light sensor of claim 8, wherein a difference between the first voltage applied to the second node and the bias voltage applied to the first node is smaller than a threshold voltage of the first NMOS transistor.

11. The ambient light sensor of claim 7, wherein the source follower unit comprises:
   a current source coupled between the supply voltage and the third node, the current source configured to generate a constant current; and
   a p-type metal oxide semiconductor (PMOS) transistor having a gate coupled to the second node, a drain coupled to a ground voltage, and a source coupled to the third node.

12. The ambient light sensor of claim 7, wherein the differentiation unit comprises:
   a first capacitor coupled between the third node and a fourth node;
   an inverting amplifier coupled between the fourth node and a fifth node;
   a second capacitor coupled between the fourth node and the fifth node; and
   a reset switch coupled between the fourth node and the fifth node, the reset switch configured to switch in response to the reset signal, wherein
      the differentiation unit outputs the comparison voltage at the fifth node.

* * * * *